United States Patent [19]

Franks, Jr.

[11] Patent Number: 4,925,395
[45] Date of Patent: * May 15, 1990

[54] CLAMP FOR ELECTRICALLY CONDUCTIVE STRIPS

[76] Inventor: George J. Franks, Jr., 664 Thompson Cir., Inverness, Ill.

[*] Notice: The portion of the term of this patent subsequent to May 9, 2006 has been disclaimed.

[21] Appl. No.: 291,702

[22] Filed: Dec. 29, 1988

Related U.S. Application Data

[63] Continuation-in-part of Ser. No. 234,975, Aug. 22, 1988, Pat. No. 4,884,976, which is a continuation-in-part of Ser. No. 116,899, Nov. 5, 1987, Pat. No. 4,828,504.

[51] Int. Cl.$^5$ .............................................. H01R 4/34
[52] U.S. Cl. .................................... 439/100; 439/803; 439/814; 269/249
[58] Field of Search ............... 439/411, 413, 431–435, 439/803, 810, 813, 814, 100; 269/249

[56] References Cited

U.S. PATENT DOCUMENTS

| | | | |
|---|---|---|---|
| 2,260,136 | 10/1941 | Bergan | 174/51 |
| 2,420,895 | 5/1947 | Merriman | 173/273 L |
| 2,632,068 | 3/1953 | Froebel et al. | 200/51.07 |
| 2,889,451 | 6/1959 | Longo | 439/573 |
| 3,363,219 | 1/1968 | Hubbard et al. | 339/95 |
| 4,476,759 | 10/1984 | Aderneck | 269/249 |
| 4,529,261 | 7/1985 | Stenz et al. | 439/810 |
| 4,538,879 | 9/1985 | Wagener | 339/22 B |
| 4,626,051 | 12/1986 | Franks, Jr. | 339/14 |
| 4,776,808 | 10/1980 | Davidson | 439/100 |

FOREIGN PATENT DOCUMENTS

| | | | |
|---|---|---|---|
| 1132999 | 7/1962 | Fed. Rep. of Germany . | |
| 1126748 | 7/1956 | France . | |
| 2195837 | 4/1988 | United Kingdom | 439/431 |

*Primary Examiner*—Gary F. Paumen
*Attorney, Agent, or Firm*—Jenner & Block

[57] ABSTRACT

A clamping device having a U-shape provides a mechanical and electrical connection between two flat ribbons or strips of electrically conductive material. The strips of material may, for example, be thin copper bars for grounding purposes in an underground telephone vault. A mounting means allows the clamp to be secured to a structure wall. A pair of threaded bolts are offset from each other and are mounted in opposite legs of the U-shaped clamp. The bolts are formed with slotted heads for securing another conductor, such as a ground wire or ground ribbon, therein.

16 Claims, 1 Drawing Sheet

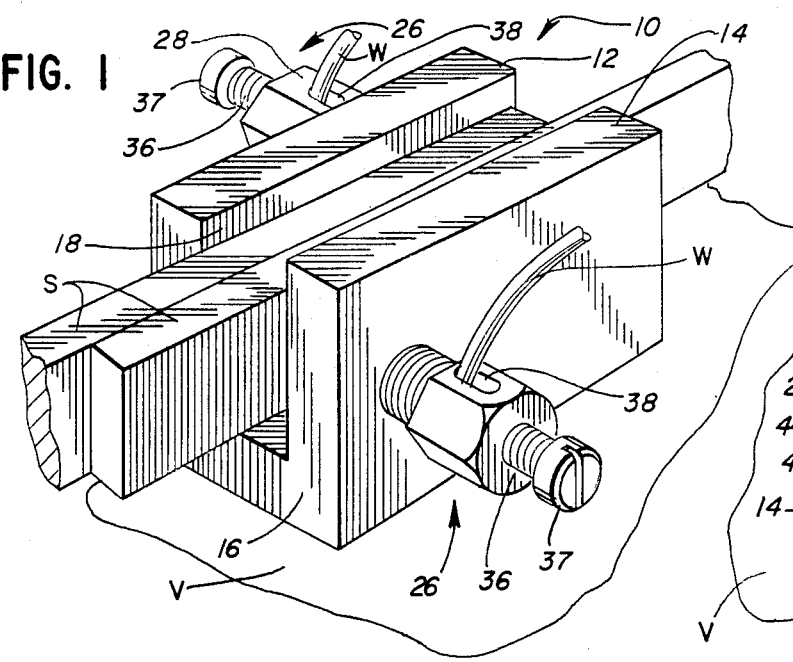
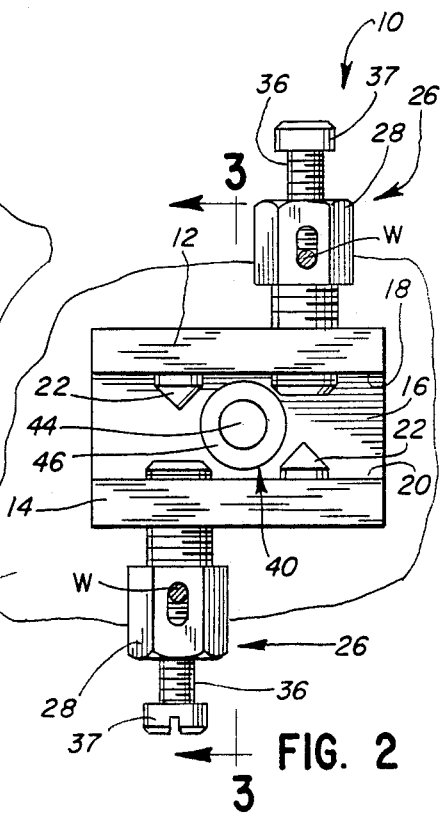
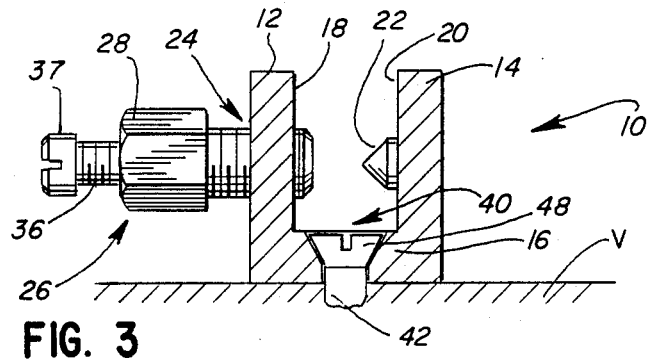
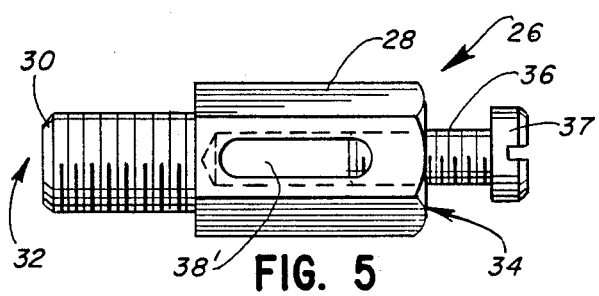
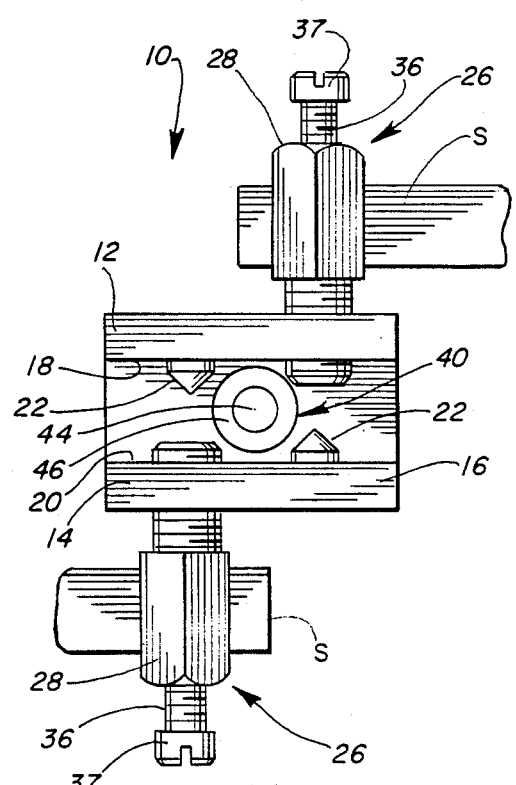

CLAMP FOR ELECTRICALLY CONDUCTIVE STRIPS

This is a continuation-in-part of Ser. No. 234,975, filed Aug. 22, 1988, now U.S. Pat. No. 4,884,976, issued Dec. 5, 1989, which is in turn a continuation-in-part of Ser. No. 116,899, filed Nov. 5, 1987, now U.S. Pat. No. 4,828,504, issued May 9, 1989, the disclosures of which are hereby incorporated by reference.

FIELD OF THE INVENTION

This invention relates in general to clamping devices for providing a mechanical and electrical connection between two flat pieces or strips of electrically conductive material. The invention further relates to clamping devices for providing a ground connection between two flat pieces or strips of electrically conductive material and a ground wire or ribbon.

BACKGROUND OF THE INVENTION

Flat strips of electrically conductive material, such as relatively soft copper, are used in numerous applications in which it is desired to provide an electrical bond between conductors, such as for grounding purposes. For example, in an underground vault for telephone equipment, it is common to provide thin strips of bonding ribbon which connect underground telephone cables to a grounding system located at the side of the vault. It is often necessary to join two bonding ribbons together, both mechanically and electrically. While clamps have been used to form the mechanical connection, it has been generally necessary to weld or solder together the pairs of bonding ribbons in order to form a sufficient electrical connection.

Further, it is often necessary to provide a ground connection between the bonding ribbons and a grounding system, typically through connection to an electrical conductor comprising part of the grounding system. The electrical conductor has generally been a ground wire or ground ribbon. While clamps have been used to form the mechanical connection to the electrical conductor, it has been generally necessary to weld or solder together the bonding ribbons to the electrical conductor in order to form a sufficient ground connection.

In an underground vault, the soldering of bonding ribbons to each other or to a ground wire or ribbon is dangerous and undesired in that the telephone cables are nitrogen filled, and this gas along with other gases which accumulate in an underground vault can be explosive. In addition, welding or soldering requires specialized equipment and skilled labor in order to form the necessary electrical connection between the bonding ribbons.

When bonding conductors are to be subjected to adverse conditions, the flat conductors may be painted or treated with a protective coating or coated with another layer of metal to provide for long-term life. For example, copper grounding straps may be provided with a pre-tinned top layer. To form an adequate electrical connection, it is necessary to penetrate any layers of dirt, paint and other non-conducting surfaces, as well as corrosion, to provide the necessary electrical connection to the base metal. Any clamp must also be able to maintain a suitable mechanical and electrical connection which will withstand the rigors of the environment in which it is to be used.

Known clamping devices for relatively flat materials have not been suitable for clamping together, both mechanically and electrically, a pair of bonding ribbons or other flat conductive materials without requiring soldering or the like which is undesirable in a number of applications. It is further desirable that any clamping device be of simple construction and relatively low cost. These desirable attributes have not been found in a single device which can also eliminate the need for soldering in underground vaults and other environments in which known methods of forming an electrical bonding connection are unsuitable.

SUMMARY OF THE INVENTION

In accordance with the present invention, a novel clamping apparatus provides a mechanical and electrical connection between a pair of flat pieces or strips of electrically conducting material. The clamping apparatus also provides a mechanical and electrical connection between the pair of flat pieces or strips and an electrical conductor, such as a ground wire or ground ribbon, comprising part of the grounding system. The clamps of the present invention are capable of providing these connections without the need for any welding or soldering. The dangers associated with welding or soldering in certain applications are therefore avoided. Further, specialized equipment and labor is no longer required.

The clamps of the present invention are substantially U-shaped and have first and second side legs or portions extending generally upward from a common base. The first and second side legs are preferably substantially parallel and opposing each other.

A pair of threaded studs or bolts and a pair of points are provided in the U-shaped clamp, with one threaded bolt being located opposite and offset from the other. As the pair of threaded bolts are tightened, they engage opposite ones of the bonding ribbons and each abrade the bonding ribbon to form an electrical connection to its adjacent bonding ribbon.

In the preferred embodiments, the U-shaped clamp has a bottom located aperture for a mounting screw which attaches the clamp to the wall of a vault. The heads of the threaded bolts have formed therein a transverse slot or bore into which a ground wire or ribbon is inserted, the ground wire or ribbon comprising part of a grounding system. The securing screw functions to secure this ground wire or ribbon to the threaded bolts to establish a mechanical and electrical connection therebetween.

One object of the present invention is to provide an improved clamp for providing a simultaneous mechanical and electrical connection between a pair of strips of electrically conductive material, with the clamp being capable of attachment to the wall of a structure in order to mount the clamp and strips at a desired location.

Another object of the present invention is to provide a clamping apparatus for a pair of electrical bonding ribbons in which additional bonding ribbons and/or ground wires can be mechanically and electrically connected, at the same time or a later time, to the pair of ribbons without the necessity for soldering.

Other objects and advantages of the invention will become apparent upon the following detailed descriptions with references to the drawings. Throughout the drawings, like reference numerals refer to like parts.

BRIEF DESCRIPTION OF THE DRAWINGS

FIG. 1 is a perspective view of one embodiment of a clamp apparatus used in joining two flat pieces or strips of material, as mounted to a wall surface;

FIG. 2 is a plan view of the embodiment shown in FIG. 1 without the strips between located therein and with ground wires secured to the bolts, as resting on the wall surface;

FIG. 3 is a sectional side view of the embodiment shown in FIG. 2 along the lines 3—3, with the addition of a sectional view of a mounting screw which attaches the clamp to the wall surface;

FIG. 4 is a plan view of one embodiment of the threaded bolt for securing a ground wire thereto;

FIG. 5 is a plan view of another embodiment of the threaded bolt for securing a ground ribbon thereto; and FIG. 6 is a plan view of a further embodiment of the clamp apparatus illustrating the use of two of the bolts of FIG. 5 with ground ribbons secured to the bolts.

DETAILED DESCRIPTION OF THE PREFERRED EMBODIMENTS

Referring to FIG. 1, there is shown an embodiment of a novel clamp apparatus 10 for mechanically and electrically connecting together two strips or flats S of electrically conductive material. Strips S may, for example, be two thin, elongated copper bars, either coated with another material, such as pre-tinned, or not, which are typically used as bonding ribbons for grounding purposes such as in an underground telephone vault.

In an existing underground telephone vault, for example, a bonding ribbon may be replaced with a new ribbon, but the new ribbon must bond or bridge to an existing electrical ribbon which may be corroded. In the situation in which both electrical conductors are not new or may not be new, the embodiments shown in the drawings are useful in forming an electrical connection between both pairs of bonding ribbons S through the clamp 10 itself, while simultaneously forming a sufficient mechanical connection to adequately hold together the ribbons S.

As illustrated in FIGS. 1-3, clamp 10 is substantially U-shaped, and includes two upwardly extending first and second side legs or portions 12 and 14, respectively, joined to a common bottom base 16. First and second legs 12 and 14 are preferably substantially parallel to and opposing each other. First and second legs 12 and 14 have first and second inner surfaces, 18 and 20, respectively which are also preferably substantially parallel to and opposing each other.

As illustrated in FIGS. 2-3, a point 22 is fixedly formed on each of first inner surface 18 and second inner surface 20. The first point 22 on first inner surface 18 extends outwardly towards second inner surface 20, and the second point 22 on second inner surface 20 extends outwardly towards first inner surface 18.

Points 22 and all components of the clamp are formed of an electrically conducting material. Points 22 are generally cone-shaped and are of harder material than the material of the strips S. Points 22 may comprise an insert (not shown) consisting of an enlarged head and a reduced diameter shank which snugly fits into a reduced diameter bore formed entirely or partially through the first leg 12 and second leg 14. In this manner, each point 22 can readily be formed of a hardened material and it is unnecessary to form the remainder of the clamp 10 of the same material in order to reduce the expenses of forming the clamp. Alternatively, points 22 may be integral with the first leg 12 and second leg 14, particularly when the straps S to be clamped are very soft copper bonding ribbons, in which event the entire clamp as well as the point may be formed of bronze.

The second leg 14 of clamp 10 has a bore 24 formed therethrough which is substantially coaxial with the axis of the center line of point 22 on first inner surface 18. The bore 24 is fine threaded and has received therein a threaded stud or bolt 26. Bolt 26 is preferably formed of an electrically conducting material, such as bronze, which is harder than the material of the strips S. Bolt 26 has a hexagonally-shaped head 28.

Offset from the bolt 26 in second leg 14 and oppositely located is a second threaded bolt 26 located in a threaded bore 24 through the first leg 12, and located coaxially with the point 22 on the second leg 14.

Each bolt 26 has an annular abrading edge 30 which surrounds a recess 32 which is preferably cup-shaped or cone-shaped and is located in the free end thereof as shown in FIG. 4. The annular abrading edge 30 is of sufficient hardness to abrade and penetrate the material of the straps S upon tightening of bolt 26. In the case of bonding ribbon of soft copper, the normal roughness in machining the bolt is generally sufficient to grind through any material coating the strap S as well as corrosion which may be on the strap. However, the abrading edge 30 may be formed with a knife edge or a serrated annular surface as disclosed in U.S. Pat. No. 4,828,504, issued May 9, 1989, the disclosure of which is hereby incorporated by reference herein.

In operation, two straps S of metal are placed in a position substantially between first and second legs 12 and 14 as illustrated in FIG. 1. Each threaded bolt 26 is turned by means of the hexagonally-shaped head 28 causing a portion of straps S adjacent recess 32 to be trapped between point 22 and the free end of bolt 26. As bolt 26 continues to be tightened, the centering of bolt 30 directly over the fixed point 22 causes maximum force to be applied during tightening. When straps S are placed within the composite clamp, and the bolts 26 are tightened, a mechanical and electrical connection is provided to each of the straps S sufficient to eliminate soldering.

Straps S are mechanically deformed adjacent point 22 and the recess 32 in bolt 26. Recess 32 formed in the face of bolt 26 also functions to retain some of the loose material mechanically worked or scraped from the face of straps S to minimize contamination which might occur from the mechanical abrasion of the panel.

The pair of strips form an S-shaped or snake-like configuration through the clamping device because the bolts 26 are on opposed sides and each engage and clamp the straps S towards opposite sides. This forms a very superior mechanical connection and, in addition, a superior electrical connection formed by the connection from a strap S through the adjacent abrading edge 30 and the bolt itself to the electrically conductive clap device 10 and thence to the opposite bolt and abrading edge into the opposite strap S. The bonding ribbon in a vault may be replaced with a new ribbon and adequately coupled to an existing already corroded bonding ribbon in an underground vault.

As illustrated in FIGS. 1-4, bolt 26 has a head 28 for connecting another electrical conductor, such as a ground wire W, to the clamp and ribbons S. The head 28 has an internal bore 34 coaxial with the longitudinal axis of the bolt 26 as illustrated in FIG. 4. The bore 34 is threaded to accommodate a ground wire securing screw 36. As ground wire securing screw 36 is turned by means of a screw head 37, the securing screw 36 moves downward through the bore 34.

The bore 34 intersects a transverse slot or bore 38 which receives the ground wire W therein. Securing screw 36 engages ground W in slot 38 upon tightening and mechanically and electrically secures ground wire W to the bolt 26, and hence to clamp 10. The bore 38 is of elongated shape with length sufficient to receive one or more additional ground wires W therein. Alternatively, the bore 38 has a diameter slightly larger than the diameter of ground wire W to be inserted.

Clamp 10 includes a means to attach the clamp to a structure wall, such as the wall of a vault V, so that the bonding ribbons can be mounted and retained in a desired location within a structure. The mounting mechanism includes an attachment aperture 40 located in the bottom of base 16 and a screw or bolt 42 for securing the clamp 10 to a desired location on the vault V wall.

As shown in FIGS. 2 and 3, clamp attachment hole 40 has a cylindrical portion 44 with a diameter to receive therethrough the mounting screw 42. At the top of cylindrical portion 44 is a countersink portion 46 formed to receive enlarged head 48 of mounting bolt 42. Mounting bolt 42 and countersink portion 46 preferably form a complementary relationship such that as mounting bolt 42 is tightened, head 48 becomes countersunk into countersink portion 46 and the head is flush with the top surface of base 16 to not interfere with the placement of straps S.

An additional embodiment is illustrated in FIGS. 5-6 for connection of a clamp 10 to grounding ribbons S rather than ground wires W. Grounding ribbon S can be of the same construction as or identical to bonding ribbons S. In this embodiment, clamp 10 has substantially the same construction, as discussed above. Clamp 10 has a bolt 26 with a head 28 for connecting a grounding ribbon S or other conductor thereto, as illustrated in FIGS. 5-6. Head 28 has an internal bore 34 coaxial with the longitudinal axis of the bolt 26.

The bore 34 intersects an elongated traverse slot or bore 38' which receives a ground ribbon S therein. Upon tightening, securing screw 36 engages ground ribbon S in slot 38' and thus secures mechanically and electrically the ground ribbon R to the bolt 26 and hene to clamp 10. The bore 38' may be of elongated shape with length and width sufficient to receive one or more additional ground ribbons S. Alternatively, the bore 38, has a length and width slightly larger than ground ribbon S to be inserted.

Clamp 10 in FIG. 6 has two bolts 26' which are each used to secure a ground ribbon S.

Clamp 10 may also be provided with both a bolt 26 with a slot 38 and a second bolt 26 with slot 38' on opposite first and second inner surfaces 18 and 20, whereby both a ground wire and a ground ribbon are connected to the clamp 10. As discussed above, both the ground wire and the ground ribbon are therefore mechanically and electrically connected to the clamp.

Further, clamp 10 can be provided with only one of either a bolt 26 or a bolt 26,, whereby either a ground wire or a ground ribbon is mechanically and electrically connected to the clamp. This bolt is useful in situations where only one connection to a ground system is desired.

While the invention is described in connection with preferred embodiments, it will be understood that it is not intended to limit the invention to these embodiments. On the contrary, it is intended to cover all alternatives, modifications and equivalents as may be included in the spirit and scope of this invention as defined by the appended claims.

What is claimed is:

1. A clamp for mechanically and electrically connecting together two strips of electrically conductive material to an electrical conductor, comprising:
    a first leg and a second leg extending outwardly from a common base, with the base having an attachment hole for attaching the clamp to a surface by passing an attachment stud means therethrough and into the surface;
    a threaded bore located in the first leg;
    a threaded stud means rotatably mounted in the threaded bore and rotatable to affect axial movement toward the opposite leg, the two strips being positionable between the legs with one of the strips being engageable by the threaded stud means.

2. The clamp of claim 1 wherein the attachment hole has a cylindrical portion adjacent the surface.

3. The clamp of claim 2 wherein an outwardly and upwardly sloping portion is formed at the top of the cylindrical portion for accepting a head of the attachment stud means.

4. The clamp of claim 1 wherein the attachment stud means is capable of being countersunk into the attachment hole upon mounting of the clamp to the surface.

5. The clamp of claim 1 further comprising a head on the threaded stud means having formed therein a first bore for receiving an electrical conductor, a second threaded bore intersecting the first bore, and a securing screw in the first bore for securing the electrical conductor.

6. The clamp of claim 5 wherein the diameter of the first bore is slightly larger than the diameter of a ground wire to be inserted therein.

7. The clamp of claim 3 wherein the first bore is an elongated slot.

8. A clamp for mechanically and electrically connecting together two strips of electrically conductive material to another electrical conductor, comprising:
    a first leg and a second leg extending outwardly from a common base;
    a first threaded bore located in the first leg and a second threaded bore located in the second leg and having an axis offset from the axis of the first bore;
    a pair of threaded stud means rotatably mounted in the threaded bores and each having a free end and each rotatable to affect axial movement of its free end toward the opposite leg, the two strips being positionable between the legs with one of the strips being engageable by one of the threaded stud means and the other of the strips being engageable by the other of the threaded stud means; and
    at least one of the threaded stud means including a head having a pair of intersecting bores therein, one of the bores holding another electrical conductor therein, and the other of the bores being threaded and containing a screw for engaging said another electrical conductor.

9. The clamp of claim 8 wherein said base has an attachment hole for attaching the clamp to a surface by passing an attachment stud means therethrough and into the surface.

10. The clamp of claim 9 wherein the attachment hole has a cylindrical portion adjacent the surface and a outwardly and upwardly sloping portion formed at the top of the cylindrical portion for accepting a head of the attachment stud means.

11. The clamp of claim 9 wherein the attachment stud means is countersunk into the attachment hole upon mounting of the clamp to the surface.

12. The clamp of claim 8 wherein the electrical conductor holding bore in the threaded stud means is capable of accepting a ground wire.

13. The clamp of claim 8 wherein the electrrical conductor holding bore in the threaded stud means is capable of accepting a ground ribbon.

14. The clamp of claim 8 including a point fixedly located on the first leg and being coaxial with the second threaded bore to thereby clamp the strips between the point and the threaded stud means rotatably mounted in the second leg.

15. The clamp of claim 14 including another point located on the second leg and being coaxial with the first threaded bore to thereby clamp the strips between said another point and the threaded stud means rotatably mounted in the first leg.

16. The clamp of claim 14 wherein the threaded stud means in the second threaded bore has an annular abrading surface surrounding a recess with the recess being of complementary shape to the first point.

* * * * *